United States Patent
Chen et al.

(10) Patent No.: US 8,433,006 B2
(45) Date of Patent: Apr. 30, 2013

(54) SPECTRUM SENSING FOR OFDM SIGNALS BY UTILIZING PILOT TONES

(75) Inventors: Hou-Shin Chen, East Brunswick, NJ (US); Wen Gao, West Windsor, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 376 days.

(21) Appl. No.: 12/452,629

(22) PCT Filed: Dec. 6, 2007

(86) PCT No.: PCT/US2007/024987
§ 371 (c)(1),
(2), (4) Date: Apr. 22, 2010

(87) PCT Pub. No.: WO2009/011688
PCT Pub. Date: Jan. 22, 2009

(65) Prior Publication Data
US 2010/0202574 A1    Aug. 12, 2010

Related U.S. Application Data

(60) Provisional application No. 60/959,372, filed on Jul. 13, 2007.

(51) Int. Cl.
*H03D 1/00* (2006.01)
*H04L 27/06* (2006.01)

(52) U.S. Cl.
USPC .......................................... 375/343; 370/206

(58) Field of Classification Search .................. 370/206; 375/130, 142, 150, 343; 725/100, 131; 348/726, 348/729, 731
See application file for complete search history.

(56) References Cited

U.S. PATENT DOCUMENTS

| 5,363,144 A * | 11/1994 | Park | 348/614 |
| 5,886,748 A * | 3/1999 | Lee | 348/614 |
| 8,004,618 B2 * | 8/2011 | Gouhara | 348/731 |
| 2001/0014086 A1 * | 8/2001 | Jeong et al. | 370/335 |

(Continued)

FOREIGN PATENT DOCUMENTS

| GB | 2431548 | 4/2007 |
| JP | 2006135674 | 5/2006 |

(Continued)

OTHER PUBLICATIONS

"Digital Video BroadcastingFraming Structure, Channel Coding and modulation for digital Terrestrial Television", ETSI 300 744 v1.5.1. European Standard (Telecommmunications Series), Jun. 2004.

(Continued)

*Primary Examiner* — Jean B Corrielus
(74) *Attorney, Agent, or Firm* — Robert D. Shedd; Joseph J. Opalach

(57) ABSTRACT

An apparatus comprises a downconverter for providing a signal that may be a received orthogonal frequency division multiplexed (OFDM) symbols from a selected channel, each OFDM symbol comprising N subcarriers at least some of which are pilot subcarriers; and a processor that (a) correlates the received OFDM symbols for providing at least one correlated value, (b) generates a metric value as a function of the at least one correlated value and (b) compares the metric value to a threshold value for detecting if an incumbent signal is present.

12 Claims, 6 Drawing Sheets

U.S. PATENT DOCUMENTS

| | | | |
|---|---|---|---|
| 2003/0142729 A1* | 7/2003 | Subrahmanya et al. | 375/147 |
| 2003/0161428 A1* | 8/2003 | Garrett et al. | 375/368 |
| 2004/0005020 A1* | 1/2004 | Dent | 375/343 |
| 2004/0252244 A1* | 12/2004 | Bae et al. | 348/725 |
| 2006/0084444 A1 | 4/2006 | Kossi et al. | |
| 2006/0109931 A1 | 5/2006 | Asai et al. | |
| 2007/0174891 A1* | 7/2007 | Gouhara | 725/131 |
| 2007/0254594 A1* | 11/2007 | Jansen | 455/67.13 |
| 2007/0264950 A1* | 11/2007 | Husted et al. | 455/136 |
| 2007/0274405 A1* | 11/2007 | Adachi | 375/260 |
| 2008/0219191 A1* | 9/2008 | Wang et al. | 370/280 |
| 2008/0291817 A1* | 11/2008 | Gupta | 370/208 |
| 2009/0109990 A1* | 4/2009 | Calcev et al. | 370/445 |
| 2009/0286565 A1 | 11/2009 | Liu et al. | |
| 2010/0035568 A1* | 2/2010 | Ghosh | 455/192.1 |

FOREIGN PATENT DOCUMENTS

| | | |
|---|---|---|
| WO | WO2006043136 | 4/2006 |
| WO | WO 2007056020 | 5/2007 |
| WO | WO2007056076 | 5/2007 |

OTHER PUBLICATIONS

"Spectrum Sensing for OFDM Signals by Utilizing Pilot tones", pp. 1-5, Aug. 1997.

Bolcskei.:"Blind Estimation of Symbol Timing and Carrier Frequency Offset in Wireless OFDM Systems", IEEE Transactions on Communications, vol. 49, No. 6. Jun. 2001, pp. 988-999.

Chen et al.:"Signature Based Spectrum Sensing Algorithms for IEEE 802.22 WRAN", IEEE Communications Society subject matter experts for publication in the ICC 2007 proceedins, pp. 6487-6492, XP0031126706.

Zeng et al.: "Eigenvalue Based Sensing Algorithms", IEEE P802.22 Wireless RANs, Institute for Infocomm Research, Jul. 14, 2006, Slide 1 thru Slide 13.

Gardner.:"Measurement of Spectral Correlation", IEEE Transactions on Acoustics Speech and Signal Processing, vol. ASSP-34, No. 5, Oct. 1986, pp. 1111-1123.

Lv et al.:"Sensing Schemes for DVB-T", IEEE P802.22 Wireless RANs, Jul. 19, 2006, slides 1-11.

Lv et al.:"Sensing Schemes for DVB-T", IEEE P802.22 Wireless RANs, Nov. 10, 2006, slide 1-11.

Mitola III.:"Cognitive Radio", An Integrated Agent Architecture for Software Defined Radio, Royal Institute of Technology, Kista, Sweden, May 8, 2000, pp. 1-304.

Shellhammer et al.:"Performance of the Power Detector with Noise Uncertainty", IEEE P802.22 Wireless RANs, QUALCOMM, Jul. 17, 2006, Slide 1-34.

Turkenich et al.: "Text on Dual FPLL pilot Sensing -for Informative Annex on Sensing Techniques", IEEE P802.22 Wiireless Rans, Monisha Ghosh, Phillips, Jul. 2007, p. 1-6.

Gardner.:"Exploitation of Spectral Redundancy in Cyclostationary Signals", IEEE SP Magazine, Apr. 1991, pp. 14-36.

European Search Report dated May 19, 2008.

* cited by examiner

FIG. 2

| mode | Number of Subcarriers (N) | CP Length ratio (α) |
|---|---|---|
| 1 | 2048 | 1/4 |
| 2 | 2048 | 1/8 |
| 3 | 2048 | 1/16 |
| 4 | 2048 | 1/32 |
| 5 | 8192 | 1/4 |
| 6 | 8192 | 1/8 |
| 7 | 8192 | 1/16 |
| 8 | 8192 | 1/32 |

Table One – DVB-T Transmission Modes

*Prior Art*

US 8,433,006 B2

SPECTRUM SENSING FOR OFDM SIGNALS BY UTILIZING PILOT TONES

This application claims the benefit, under 35 U.S.C. §365 of International Application PCT/US2007/024987, filed Dec. 6, 2007, which was published in accordance with PCT Article 21(2) on Jan. 22, 2009 in English, and which claims the benefit of U.S. Provisional Patent Application No. 60/959,372, filed on Jul. 13, 2007, in English. Pursuant to 35 U.S.C. §371, this application is a National Stage Entry of International Application PCT/US2007/024987.

BACKGROUND OF THE INVENTION

The present invention generally relates to communications systems and, more particularly, to wireless systems, e.g., terrestrial broadcast, cellular, Wireless-Fidelity (Wi-Fi), satellite, etc.

Recently, Cognitive Radio (CR) (e.g., see, J. Mitola III, "Cognitive Radio: An Integrated Agent Architecture for Software Defined Radio," Ph.D. Thesis, Royal Institute of Technology, Sweden, May 2000) has been proposed to implement negotiated, or opportunistic, spectrum sharing to provide a viable solution to the problem of sparsity of the wireless spectrum. To operate CR properly, it is important to perform spectrum sensing, i.e., the ability to detect licensed signals in their assigned spectrum bands. As a result, spectrum sensing becomes one of the core technologies of CR. The most challenging part of performing spectrum sensing is sensing signals in very low signal-to-noise ratio (SNR) conditions.

In this regard, a Wireless Regional Area Network (WRAN) system is being studied in the IEEE 802.22 standard group. The WRAN system is intended to make use of unused television (TV) broadcast channels in the TV spectrum, on a non-interfering basis, to address, as a primary objective, rural and remote areas and low population density underserved markets with performance levels similar to those of broadband access technologies serving urban and suburban areas. In addition, the WRAN system may also be able to scale to serve denser population areas where spectrum is available. Since one goal of the WRAN system is not to interfere with TV broadcasts, a critical procedure is to robustly and accurately sense the licensed TV signals that exist in the area served by the WRAN (the WRAN area).

In the United States, the TV spectrum currently comprises ATSC (Advanced Television Systems Committee) broadcast signals that co-exist with NTSC (National Television Systems Committee) broadcast signals. The ATSC broadcast signals are also referred to as digital TV (DTV) signals. Currently, NTSC transmission will cease in 2009 and, at that time, the TV spectrum will comprise only ATSC broadcast signals. However, in some areas of the world, instead of ATSC-based transmission, DVB (Digital Video Broadcasting)-based transmission may be used. For example, DTV signals may be transmitted using DVB-T (Terrestrial) (e.g., see ETSI EN 300 744 V1.4.1 (2001-01), *Digital Video Broadcasting (DVB); Framing structure, channel coding and modulation for digital terrestrial television*). DVB-T uses a form of a multi-carrier transmission, i.e., DVB-T is OFDM (orthogonal frequency division multiplexing)-based.

Since, as noted above, one goal of the WRAN system is to not interfere with those TV signals that exist in a particular WRAN area, it is important in a WRAN system to be able to detect DVB-T broadcasts (licensed signals) in a very low signal to noise ratio (SNR) environment. For an OFDM signal comprising N sub-carriers with sub-carrier spacing as Fs/N (Hz), its symbols in the time domain can be represented by samples with sample rate Fs (Hz). As known in OFDM transmission, each OFDM symbol includes a cyclic prefix (CP) to mitigate the affects of inter-symbol-interference (ISI). An example of an OFDM symbol is shown in FIG. 1. OFDM symbol 10 comprises two portions: a symbol 12 and CP 11. The symbol 12 comprises N samples. The CP 11 consists simply of copying the last L samples (portion 13 of FIG. 1) from each symbol and appending them in the same order to the front of the symbol. As can be observed from FIG. 1, the symbol length of an OFDM symbol, M, is: M=N+L; where N is the number of subcarriers and L is the length of the cyclic prefix (CP). In this regard, the subcarriers used in an OFDM system and the length of the CP can be dynamically varied according to particular channel conditions. In particular, as shown in Table One of FIG. 2, a DVB-T signal can be transmitted in accordance with any one of eight transmission modes, each transmission mode having a different number (N) of subcarriers and CP length ratio ($\alpha$), i.e., the ratio of the CP length over the symbol length N. For example, in transmission mode 1, the number of subcarriers, N, is equal to 2048 (2K mode) and the length ratio of the CP is 1/4, i.e., the CP consists of L=1/4 (2048)=512 samples. Similarly, in transmission mode 6, the number of subcarriers, N, is equal to 8192 (8K mode) and the length ratio of the CP is 1/8, i.e., the CP consists of L=1/8(8192)=1024 samples.

SUMMARY OF THE INVENTION

In accordance with the principles of the invention, an apparatus comprises a downconverter for providing a signal that may be a received orthogonal frequency division multiplexed (OFDM) symbols from a selected channel, each OFDM symbol comprising N subcarriers at least some of which are pilot subcarriers; and a processor that (a) correlates the received OFDM symbols for providing at least one correlated value, (b) generates a metric value as a function of the at least one correlated value and (b) compares the metric value to a threshold value for detecting if an incumbent signal is present.

In an illustrative embodiment of the invention, the receiver is a Wireless Regional Area Network (WRAN) endpoint, and the type of signal is a DVB-T signal having eight possible transmission modes, each mode having pilot subcarriers. The WRAN endpoint processes a received signal that may be a DVB-T signal for correlating OFDM symbols, such that a resulting metric value is compared to a threshold for detecting if an incumbent signal is present.

In view of the above, and as will be apparent from reading the detailed description, other embodiments and features are also possible and fall within the principles of the invention.

BRIEF DESCRIPTION OF THE DRAWINGS

FIG. 2 shows Table One, which lists the different possible transmission modes for a DVB-T signal.

DETAILED DESCRIPTION

Figure 1:
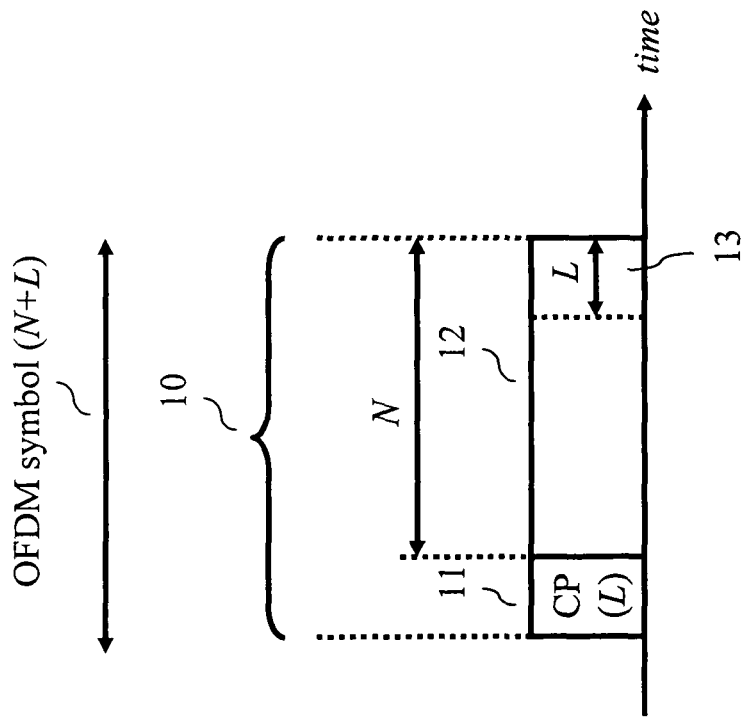
FIG. 1 shows an OFDM symbol.

Other than the inventive concept, the elements shown in the figures are well known and will not be described in detail.

Also, familiarity with television broadcasting, receivers and video encoding is assumed and is not described in detail herein. For example, other than the inventive concept, familiarity with current and proposed recommendations for TV standards such as NTSC (National Television Systems Committee), PAL (Phase Alternating Lines), SECAM (SEquential Couleur Avec Memoire), ATSC (Advanced Television Systems Committee), and networking, such as IEEE 802.16, 802.11h, etc., is assumed. Further information on DVB-T broadcast signals can be found in, e.g., ETSI EN 300 744 V1.4.1 (2001-01), *Digital Video Broadcasting (DVB); Framing structure, channel coding and modulation for digital terrestrial television*. Likewise, other than the inventive concept, transmission concepts such as eight-level vestigial sideband (8-VSB), Quadrature Amplitude Modulation (QAM), orthogonal frequency division multiplexing (OFDM) or coded OFDM (COFDM)) or discrete multitone (DMT), and receiver components such as a radio-frequency (RF) front-end, or receiver section, such as a low noise block, tuners, and demodulators, correlators, leak integrators and squarers is assumed. Similarly, other than the inventive concept, formatting and encoding methods (such as Moving Picture Expert Group (MPEG)-2 Systems Standard (ISO/IEC 13818-1)) for generating transport bit streams are well-known and not described herein. It should also be noted that the inventive concept may be implemented using conventional programming techniques, which, as such, will not be described herein. Finally, like-numbers on the figures represent similar elements.

As noted earlier, a WRAN system makes use of unused broadcast channels in the spectrum. In this regard, the WRAN system performs "channel sensing" (or spectrum sensing) to determine which of these broadcast channels are actually active (or "incumbent") in the WRAN area in order to determine that portion of the spectrum that is actually available for use by the WRAN system. In this example, it is assumed that each broadcast channel may be associated with a corresponding DVB-T broadcast signal. In accordance with the principles of the invention, an apparatus comprises a downconverter for providing a signal that may be a received orthogonal frequency division multiplexed (OFDM) symbols from a selected channel, each OFDM symbol comprising N subcarriers at least some of which are pilot subcarriers; and a processor that (a) correlates the received OFDM symbols for providing at least one correlated value, (b) generates a metric value as a function of the at least one correlated value and (b) compares the metric value to a threshold value for detecting if an incumbent signal is present.

Before describing illustrative examples of a DVB-T receiver, a general approach is described for using pilot tones for spectrum sensing in accordance with the principles of the invention. Under the assumption that L, the length of the cyclic prefix (CP), is longer than the length of the time-invariant channel, the $n^{th}$ sample of the $l^{th}$ OFDM symbol can be expressed as $$x_l[n] = \frac{1}{N}\sum_{k=0}^{N-1} H[k]X_l[k]e^{j2\pi kn/N} \qquad (1)$$

where N is the number of subcarriers, H[k] is the complex channel gain of the $k^{th}$ subcarrier, and $X_l[k]$ denotes the data symbols on the $k^{th}$ subcarrier of the $l^{th}$ OFDM symbol. Usually, some regular pilot tones are inserted in the frequency domain to assist the receiver in performing synchronization and channel estimation. Let P denote the set of positions of the pilot subcarriers. Then, equation (1) can be reformulated as $$x_l[n] = \frac{1}{N}\sum_{k\in P} H[k]X_l[k]e^{j2\pi kn/N} + \frac{1}{N}\sum_{k\notin P} H[k]X_l[k]e^{j2\pi kn/N}. \qquad (2)$$

It can be observed from equation (2) that the $l^{th}$ OFDM symbol has been separated into two terms, one associated with the pilot subcarriers ($k\in P$) and the other term not associated with the pilot subcarriers. Now, let $R_x^{l,m}[n]=x_l[n]x_m^*[n]$ and lets take the time-domain cross-correlation of the $l^{th}$ and $m^{th}$ OFDM symbols. This is shown in equation (3), below.

$$R_x[l, m] = \frac{1}{N}\sum_{n=0}^{N-1} R_x^{l,m}[n] \qquad (3)$$

After some calculations and recognizing that $E[X_l[k]]=0$ for $k\notin P$, where $E[\cdot]$ is the expectation operator, the expectation of equation (3) can be simplified as:

$$E\{R_x[l, m]\} = \frac{1}{N}\sum_{k\in P} |H[k]|^2, \qquad (4)$$

which is a positive value. Therefore, and in accordance with the principles of the invention, this property can be utilized to implement spectrum sensing for OFDM systems employing pilot tones. In practice, the effects of timing offset and frequency offset should also be considered. However, since equation (4) is not affected by timing delay, it is possible to only consider frequency offset. Furthermore, when the sampling clock offset is not too large, equation (4) is almost unaffected.

Now, let $y_l[n]$ denote the received $l^{th}$ OFDM symbol, $$y_l[n]=x_l[n]e^{j2\pi f_\Delta(lM+n)/N}+w_l[n]. \qquad (5)$$

where $f_\Delta$ is carrier frequency offset normalized to the subcarrier spacing, M=N+L is the number of samples of an OFDM symbol and $w_l[n]$ is a noise term. Then, it can be easily shown that $$E\{R_y[l, m]\} = e^{j2\pi f_\Delta(l-m)M/N}\frac{1}{N}\sum_{k\in P} |H[k]|^2. \qquad (6)$$

Therefore, in the presence of a frequency offset, the correlation of two OFDM symbols is multiplied by a phase term. Because of this phase term, correlations of different OFDM symbol index differences cannot be coherently combined, i.e., those with different value of l-m in equation (6). Moreover, it should be noted that the pilot frame structure is different from one standard to another and it should also be noted that the wireless channel may be variant so that the spectrum sensing algorithms may need to be modified although the basic approach in accordance with the principles of the invention is the same.

Turning now to applying the inventive concept to a DVB-T OFDM based system, the following algorithm is used for detecting the possible presence of an incumbent DVB-T OFDM based signal. As described in the above-noted DVB-T ETSI standard, there are two kinds of pilots: regular pilots and scattered pilots. Regular pilots are inserted in the same positions for every OFDM symbol and the subcarrier spacing between any two nearby regular pilots is not fixed. In contrast, scattered pilots are inserted every 12 subcarriers and thus there are 11 subcarrier spacings between two consecutive scattered pilots. The positions of scattered pilots are shifted for 3 subcarriers for every other OFDM symbol so that the positions of scattered pilots are repeated every 4 OFDM symbols. It should be noted that the number of the scattered pilots is larger than the number of the regular pilots. For the 2K-subcarrier mode, there are 45 regular pilots and 141 scattered pilots. Let's further define $$Q[v] = \sum_{l-m=v} R_y[l,m] \qquad (7)$$

which is the sum of correlations of two OFDM symbols which have the same index (time) difference. Let $D=N/L$ which is the ratio of the subcarrier number and the CP length. In DVB-T, D can be 4, 8, 16, and 32. In the receiver, if D points are tried that are equally spaced by L samples as initial sampling instances, there will be one point which is a correct sampling instance. Denote r[n] as the samples of the received signal. Let $$y_l^d[n] = r[Ld+Ml+n] \qquad (8a)$$

where $d=0, 1, 2, \ldots, D-1$. Then, equation (3) becomes:

$$R_y^d[l,m] = \frac{1}{N}\sum_{n=0}^{N-1} y_l^d[n](y_m^d[n])^* \qquad (8b)$$

Then equation (8b) is used to compute $$Q^d[v] = \sum_{l-m=v} R_y^d[l,m]. \qquad (9)$$

From equation (9), a decision statistic, or decision metric, T, can be formulated for determining if a DVB-T signal is possibly present as an incumbent signal. For example, or $$T = \max_d |Q^d[v]| \qquad (10)$$

$$T = \max_d \left\{ \sum_v \frac{|Q^d[v]|}{\alpha_v} \right\} \qquad (11a)$$

can be used as decision statistics, where in equation (11a), $\alpha_v$'s are combining ratios. One example of a combining ratio is:

$$\alpha_v = S_v, \qquad (11b)$$

where $S_v$ is the number of R(l,m) that are accumulated and added (e.g., equations (7) and (9)). However, using equations (10) or (11a) has its disadvantages. Equation (10) does not use all available received data and using equation (11a) for a non-coherent combining will not result in very much performance improvement.

Therefore, and in accordance with the principles of the invention, a coherent approach to forming a decision metric to coherently combine all available received data can also be used. For example, let the decision statistic T be $$T = \max_d \left| \sum_{v=1}^{V-\beta} \frac{Q^d[v]Q^d[v+\beta]^*}{\alpha_v} \right| \qquad (12)$$

where it is assumed that the maximum symbol index difference of the OFDM symbol correlation is V and β is a fixed integer. Obviously, for DVB-T OFDM systems, β should be chosen as equaling 4 because 2 OFDM symbols whose symbol index difference is a multiplication of 4 have the same pilot positions for both regular and scattered pilots. One example of a combining ratio in equation (12) is:

$$\alpha_v = S_v S_{v+\beta}, \qquad (12a)$$

Figure 3:
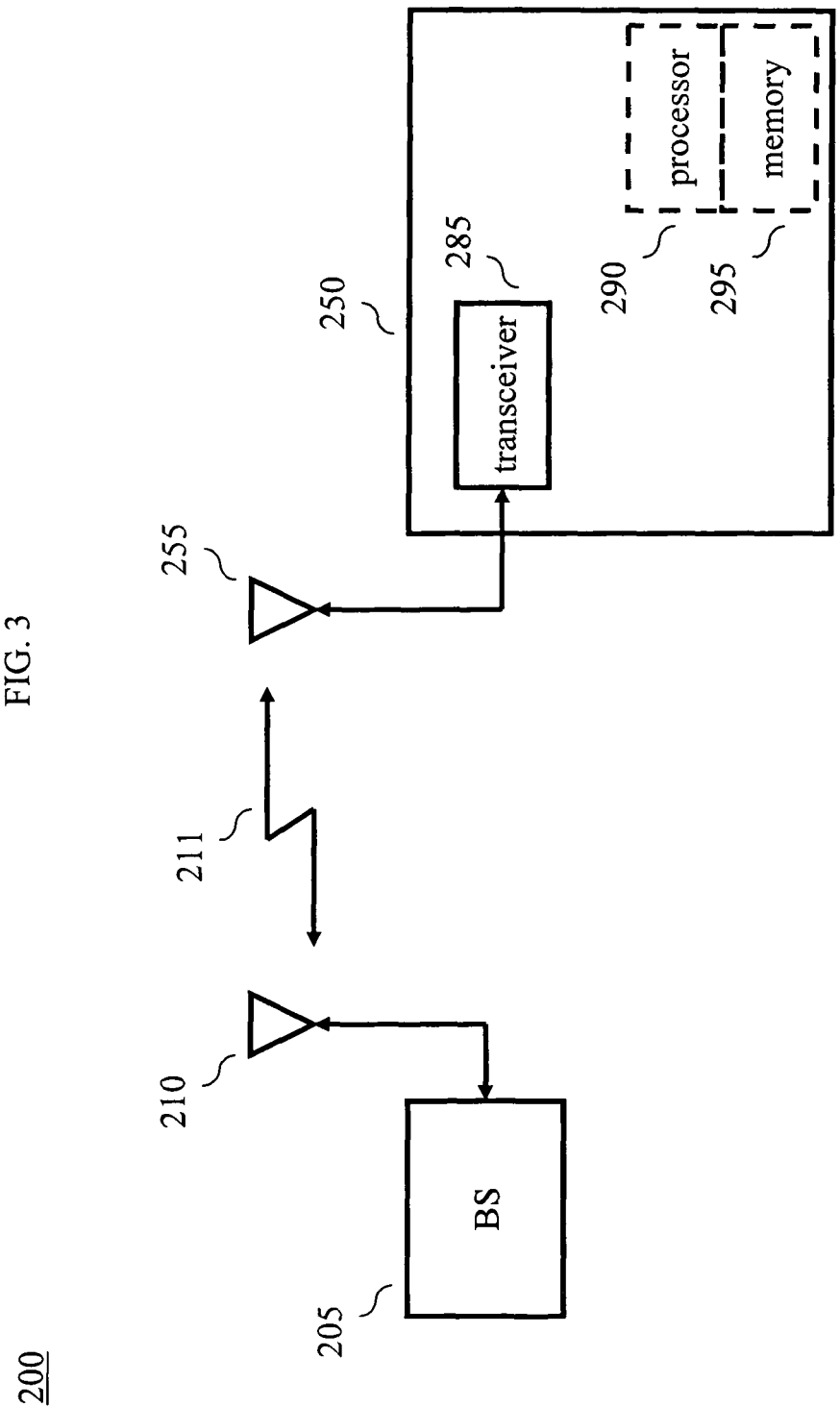
FIG. 3 shows an illustrative WRAN system in accordance with the principles of the invention.

Referring now to FIG. 3, an illustrative Wireless Regional Area Network (WRAN) system 200 incorporating the principles of the invention is shown. WRAN system 200 serves a geographical area (the WRAN area) (not shown in FIG. 3). In general terms, a WRAN system comprises at least one base station (BS) 205 that communicates with one, or more, customer premise equipment (CPE) 250. The latter may be stationary. Both CPE 250 and BS 205 are representative of wireless endpoints. CPE 250 is a processor-based system and includes one, or more, processors and associated memory as represented by processor 290 and memory 295 shown in the form of dashed boxes in FIG. 3. In this context, computer programs, or software, are stored in memory 295 for execution by processor 290. The latter is representative of one, or more, stored-program control processors and these do not have to be dedicated to the transceiver function, e.g., processor 290 may also control other functions of CPE 250. Memory 295 is representative of any storage device, e.g., random-access memory (RAM), read-only memory (ROM), etc.; may be internal and/or external to CPE 250; and is volatile and/or non-volatile as necessary. The physical layer of communication between BS 205 and CPE 250, via antennas 210 and 255, is illustratively OFDM-based via transceiver 285 and is represented by arrows 211. To enter a WRAN network, CPE 250 first attempts to "associate" with BS 205. During this attempt, CPE 250 transmits information, via transceiver 285, on the capability of CPE 250 to BS 205 via a control channel (not shown). The reported capability includes, e.g., minimum and maximum transmission power, and a supported, or available, channel list for transmission and receiving. In this regard, CPE 250 performs "channel sensing" in accordance with the principles of the invention to determine which TV channels are not active in the WRAN area. The resulting available channel list for use in WRAN communications is then provided to BS 205. The latter uses the above-described reported information to decide whether to allow CPE 250 to associate with BS 205.

Figure 4:
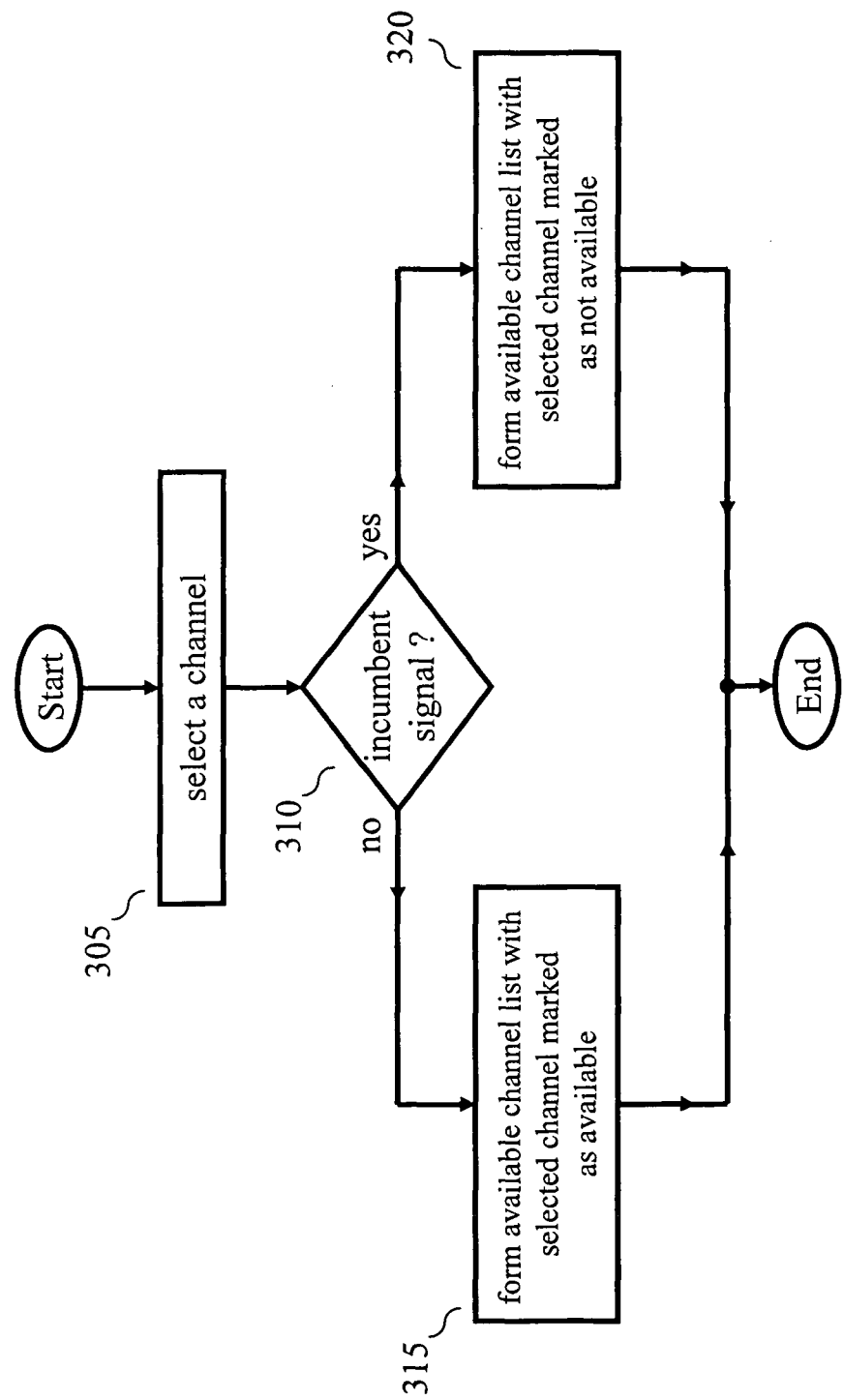
FIGS. 4-5 show illustrative flow charts in accordance with the principles of the invention for use in the WRAN system of FIG. 3.

Turning now to FIG. 4, an illustrative flow chart for use in performing channel sensing in accordance with the principles of the invention is shown. The flow chart of FIG. 4 can be performed by CPE 250 over all of the channels, or only over those channels that CPE 250 has selected for possible use. Preferably, in order to detect incumbent signals in a channel, CPE 250 should cease transmission in that channel during the detection period. In this regard, BS 205 may schedule a quiet interval by sending a control message (not shown) to CPE 250. In step 305, CPE 250 selects a channel. In this example, the channel is assumed to be one of a number of broadcast channels present in the WRAN area. In step 310, CPE 250 scans the selected channel to check for the existence of an incumbent signal. In particular, CPE 250 performs "spectrum sensing" by correlating OFDM symbols of a received orthogonal frequency division multiplexed (OFDM) signal having pilot tones, such that a resulting decision metric value (e.g., equations (10), (11a) or (12)) is compared to a threshold for detecting if an incumbent signal is present. If no incumbent signal has been detected, then, in step 315, CPE 250 indicates the selected channel as available for use by the WRAN system on an available channel list (also referred to as a frequency usage map). However, if an incumbent signal is detected, then, in step 320, CPE 250 marks the selected channel as not available for use by the WRAN system. As used herein, a frequency usage map is simply a data structure stored in, e.g., memory 295 of FIG. 3, that identifies one, or more, channels, and parts thereof, as available or not for use in the WRAN system of FIG. 3. It should be noted that marking a channel as available or not can be done in any number of ways. For example, the available channel list may only list those channel that are available, thus effectively indicating other channels as not available. Similarly, the available channel list may only indicate those channels that are not available, thus effectively indicating other channels as available.

Figure 5:
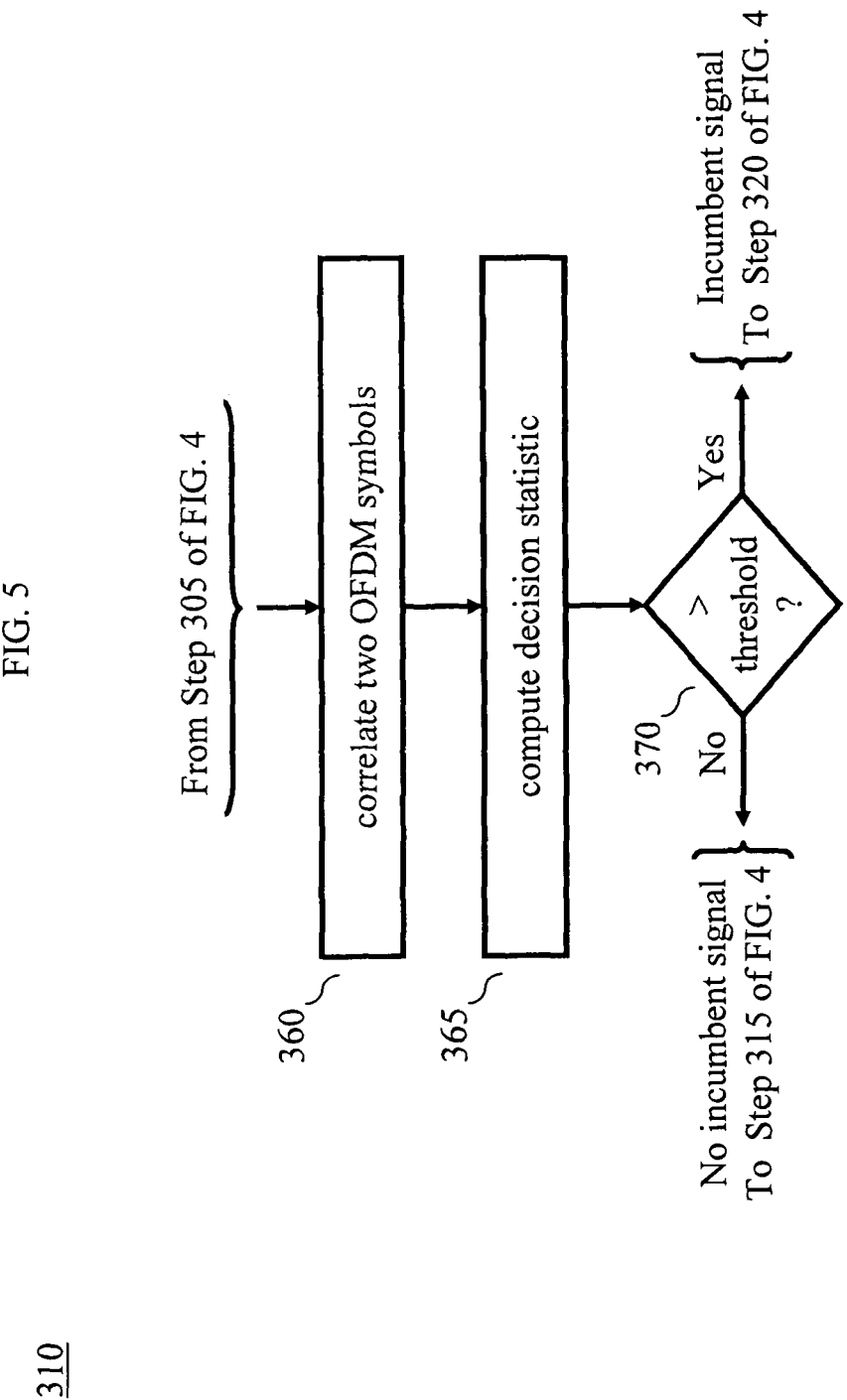

An illustrative flow chart for performing step 310 of FIG. 4 is shown in FIG. 5. In step 360, CPE 250 correlates OFDM symbols (e.g., equations (3) or (8b)). In step 365, CPE 250 forms a decision statistic, or decision metric, T (equations (10), (11a) or (12)). In step 370, CPE 250 compares the computed decision metric, T, to a threshold value, which may be determined experimentally. If the threshold value is exceeded, then it is assumed that a DVB-T broadcast signal is present. Otherwise, it is assumed that a DVB-T broadcast signal is not present.

Figure 6:
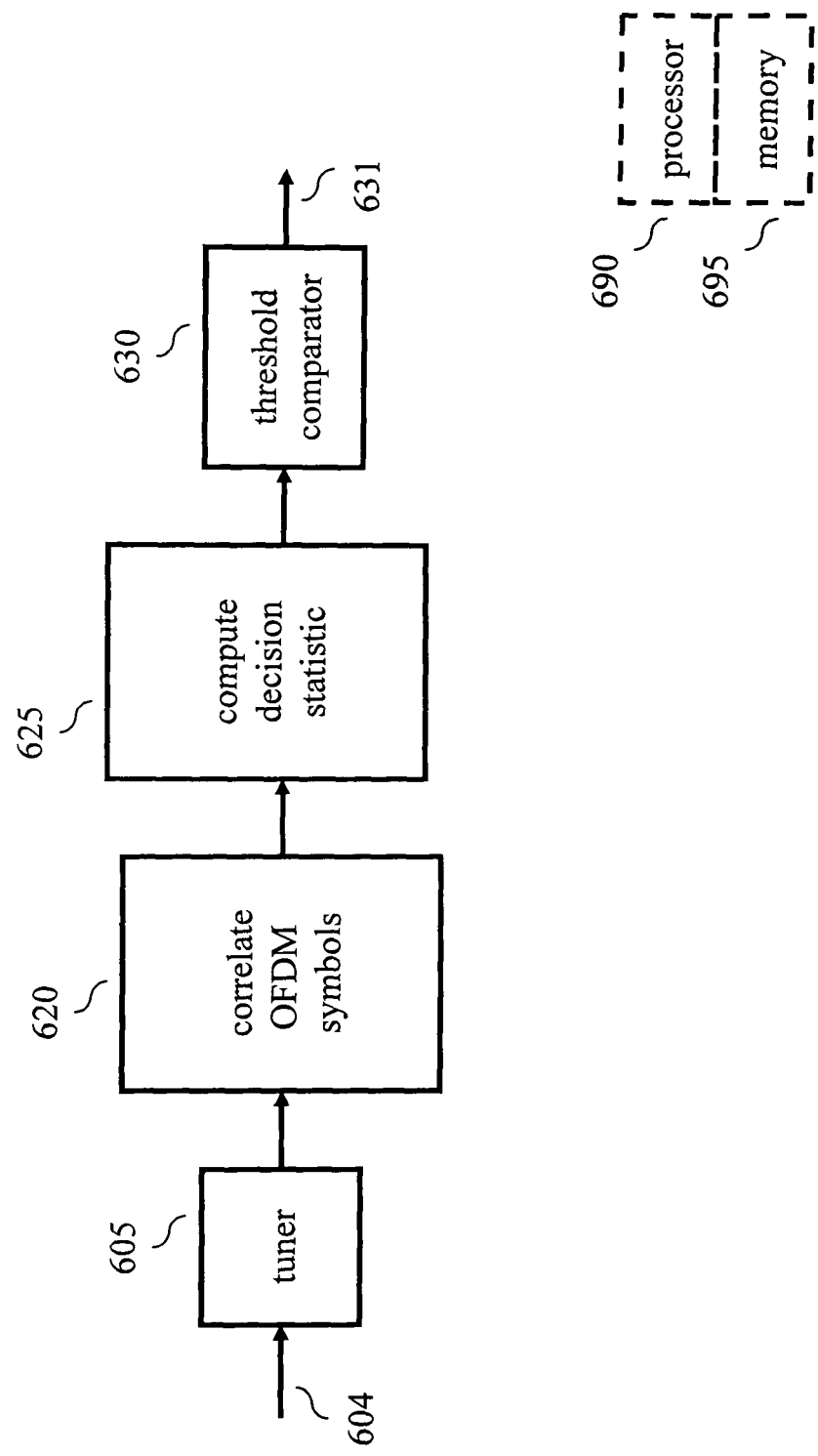
FIG. 6 shows an illustrative signal detector in accordance with the principles of the invention.

Turning briefly to FIG. 6, an illustrative portion of a receiver 600 for use in CPE 250 is shown (e.g., as a part of transceiver 285). Only that portion of receiver 600 relevant to the inventive concept is shown. The elements shown in FIG. 6 generally correspond to the description of the steps for the flow chart of FIG. 5. As such, the elements shown in FIG. 6 can be implemented in hardware, software, or as a combination of hardware and software. In this regard, receiver 600 is a processor-based system and includes one, or more, processors and associated memory as represented by processor 690 and memory 695 shown in the form of dashed boxes in FIG. 6. It should be noted that processor 690 and memory 695 may be in addition to, or the same as, processor 290 and memory 295 of FIG. 3. Receiver 600 comprises tuner 605, element 620 for computing a correlation between OFDM symbols, element 625 for computed a decision statistic and threshold comparator 630. For simplicity, some elements are not shown in FIG. 6, such as an automatic gain control (AGC) element, an analog-to-digital converter (ADC) if the processing is in the digital domain, and additional filtering. Other than the inventive concept, these elements would be readily apparent to one skilled in the art. Further, those skilled in the art would recognize that some of the processing may involve complex signal paths as necessary.

In the context of the flow chart of FIGS. 4 and 5, for each selected channel (selected via tuner 605) a received signal 604 may be present. Tuner 605 includes a downconverter for providing received OFDM symbols. Element 620 computes a correlation between received OFDM signals for determining a correlation value. Then, element 625 computes a decision metric, T, as represented by equations (10), (11a) and/or (12). Threshold comparator 630 compares the decision metric, T, against a threshold value to determine if an incumbent signal is present and provides the results via signal 631 for use by the receiver.

As described above, it is possible to detect the presence of OFDM based broadcast signals in low signal-to-noise environments by using available pilot subcarriers. It should also be noted that although the inventive concept was described in the context of CPE 250 of FIG. 3, the invention is not so limited and also applies to, e.g., a receiver of BS 205 that may perform channel sensing. Further, the inventive concept is not restricted to a WRAN system and may be applied to any receiver that performs channel, or spectrum, sensing. Likewise, although the inventive concept was illustrated in the context of a DVB-T system, the inventive concept is not so limited and is applicable to any OFDM-based system having pilot subcarriers.

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied in one, or more, integrated circuits (ICs). Similarly, although shown as separate elements, any or all of the elements (e.g., of FIGS. 3 and 6) may be implemented in a stored-program-controlled processor, e.g., a digital signal processor, which executes associated software, e.g., corresponding to one, or more, of the steps shown in, e.g., FIGS. 4 and 5. Further, the principles of the invention are applicable to other types of communications systems, e.g., satellite, Wireless-Fidelity (Wi-Fi), cellular, etc. Indeed, the inventive concept is also applicable to stationary or mobile receivers. It is therefore to be understood that numerous modifications may be made to the illustrative embodiments and that other arrangements may be devised without departing from the spirit and scope of the present invention as defined by the appended claims.

The invention claimed is:

1. A method for use in a wireless endpoint, the method comprising:
   selecting one of a number of channels;
   downconverting a received signal on the selected channel for providing received orthogonal frequency division multiplexed (OFDM) symbols, each OFDM symbol comprising N>1 subcarriers at least some of which are pilot subcarriers;
   correlating the received OFDM symbols for providing at least one correlated value;
   generating a metric value as a function of the at least one correlated value; and
   comparing the metric value to a threshold value for detecting if an incumbent signal is present,
   wherein the metric value is represented by a parameter T, where T is one of:

$$T = \max_{d} |Q^d[v]|,$$

$$T = \max_{d} \sum_{v} \frac{|Q^d[v]|}{\alpha_v},$$

or $$T = \max_d \left| \sum_{v=1}^{V-\beta} \frac{Q^d[v]Q^d[v+\beta]^*}{\alpha_v} \right|,$$

where:

$$Q^d[v] = \sum_{l-m=v} R_y^d[l, m],$$

$$R_y^d[l, m] = \frac{1}{N} \sum_{n=0}^{N-1} y_l^d[n](y_m^d[n])^*,$$

$$y_l^d[n] = r[Ld + Ml + n],$$

$\alpha_v$ is a combining ratio,
V is a maximum symbol index difference of the OFDM symbol correlation,
$\beta$ is a fixed integer,
r[n] represents samples of the received signal,
d=0, 1, 2, ..., D−1,
D=N/L,
L is a length of a cyclic prefix of each OFDM symbol, and
M=N+L.

2. The method of claim 1, wherein the correlating step coherently combines the received OFDM symbols.

3. The method of claim 1, wherein the correlating step correlates two received OFDM symbols.

4. The method of claim 1, wherein the correlating step correlates two received OFDM symbols that have the same index difference.

5. The method of claim 1, wherein the incumbent signal is a Digital Video Broadcasting (DVB) signal.

6. The method of claim 1, further comprising the step of:
indicating in an available channel list that the selected channel is available for use if no incumbent signal is present.

7. Apparatus comprising:
a downconverter for providing received orthogonal frequency division multiplexed (OFDM) symbols from a received signal on a selected channel, each OFDM symbol comprising N>1 subcarriers at least some of which are pilot subcarriers; and
a processor that (a) correlates the received OFDM symbols for providing at least one correlated value, (b) generates a metric value as a function of the at least one correlated value and (b) compares the metric value to a threshold value for detecting if an incumbent signal is present,
wherein the metric value is represented by a parameter T, where T is one of:

$$T = \max_d |Q^d[v]|,$$

or $$T = \max_d \sum_v \frac{|Q^d[v]|}{\alpha_v},$$

or $$T = \max_d \left| \sum_{v=1}^{V-\beta} \frac{Q^d[v]Q^d[v+\beta]^*}{\alpha_v} \right|,$$

where:

$$Q^d[v] = \sum_{l-m=v} R_y^d[l, m],$$

$$R_y^d[l, m] = \frac{1}{N} \sum_{n=0}^{N-1} y_l^d[n](y_m^d[n])^*,$$

$$y_l^d[n] = r[Ld + Ml + n],$$

$\alpha_v$ is a combining ratio,
V is a maximum symbol index difference of the OFDM symbol correlation,
$\beta$ is a fixed integer,
r[n] represents samples of the received signal,
d=0, 1, 2, ..., D−1,
D=N/L,
L is a length of a cyclic prefix of each OFDM symbol, and
M=N+L.

8. The apparatus of claim 7, wherein the processor coherently combines the received OFDM symbols.

9. The apparatus of claim 7, wherein the processor correlates two received OFDM symbols.

10. The apparatus of claim 7, wherein the processor correlates two received OFDM symbols that have the same index difference.

11. The apparatus of claim 7, wherein the incumbent signal is a Digital Video Broadcasting (DVB) signal.

12. The apparatus of claim 7, further comprising:
a memory for storing an available channel list to indicate that the selected channel is available for use if no incumbent signal is present.

* * * * *